United States Patent
Yasuda et al.

(10) Patent No.: US 10,100,897 B2
(45) Date of Patent: Oct. 16, 2018

(54) VIBRATION-DAMPING ELECTROMAGNETIC ACTUATOR, ACTIVE FLUID-FILLED VIBRATION-DAMPING DEVICE AND ACTIVE VIBRATION-DAMPING DEVICE USING THE SAME

(71) Applicant: SUMITOMO RIKO COMPANY LIMITED, Komaki-shi, Aichi (JP)

(72) Inventors: Takayoshi Yasuda, Komaki (JP); Yushi Hashimoto, Komaki (JP); Hironori Koyama, Komaki (JP); Masahiko Nagasawa, Komaki (JP)

(73) Assignee: SUMITOMO RIKO COMPANY LIMITED, Komaki-shi (JP)

( * ) Notice: Subject to any disclaimer, the term of this patent is extended or adjusted under 35 U.S.C. 154(b) by 111 days.

(21) Appl. No.: 15/228,413

(22) Filed: Aug. 4, 2016

(65) Prior Publication Data

US 2016/0341274 A1    Nov. 24, 2016

Related U.S. Application Data

(63) Continuation of application No. PCT/JP2015/080948, filed on Nov. 2, 2015.

(30) Foreign Application Priority Data

Nov. 26, 2014    (JP) .................................. 2014-238840

(51) Int. Cl.
*F16F 13/26* (2006.01)
*H02K 33/16* (2006.01)
(Continued)

(52) U.S. Cl.
CPC .............. *F16F 13/26* (2013.01); *F16F 13/10* (2013.01); *F16F 15/022* (2013.01); *F16F 15/03* (2013.01); *H02K 7/14* (2013.01); *H02K 33/16* (2013.01)

(58) Field of Classification Search
CPC ........ F16F 13/26; F16F 13/264; F16F 13/106; H01F 2007/163; H01K 33/00;
(Continued)

(56) References Cited

U.S. PATENT DOCUMENTS 3,510,814 A * 5/1970 Nordfors ............. F16K 31/0658
                                                    251/129.15
5,146,124 A * 9/1992 Higham ................... F16F 7/116
                                                    310/17
(Continued)

FOREIGN PATENT DOCUMENTS

DE          69716184 T2     3/2003
JP          2005-291276 A   10/2005
(Continued)

OTHER PUBLICATIONS

Sep. 29, 2017 Office Action issued in German Patent Application No. 112015001057.2.
(Continued)

*Primary Examiner* — Bradley T King
(74) *Attorney, Agent, or Firm* — Oliff PLC

(57) ABSTRACT

A vibration-damping electromagnetic actuator including: a stator; a movable member displaceable relative to the stator, and being disposed within or about it; a coil member with a coil generating a magnetic field through energization, which is disposed at one of the stator and the movable member; an armature displaceable relative to the coil member by an effect of the magnetic field generated by the coil, which is disposed at the other one of the stator and the movable
(Continued)

member; a tubular guide sleeve disposed between the stator and the movable member so that the movable member is slidable along the guide sleeve; and an elastic support body fixed to the guide sleeve being clamped by the stator at a portion of the elastic support body apart from the guide sleeve so that the guide sleeve is elastically supported by the stator.

6 Claims, 4 Drawing Sheets

(51) Int. Cl.
| | | |
|---|---|---|
| *F16F 13/10* | (2006.01) | |
| *F16F 15/02* | (2006.01) | |
| *F16F 15/03* | (2006.01) | |
| *H02K 7/14* | (2006.01) | |

(58) Field of Classification Search
CPC ........ H01K 33/02; H01K 33/18; H02K 33/00; H02K 33/02; H02K 33/18
See application file for complete search history.

(56) References Cited

U.S. PATENT DOCUMENTS

| | | | | |
|---|---|---|---|---|
| 5,333,846 A * | 8/1994 | Goto | ..................... | F16F 13/262 267/140.14 |
| 6,059,275 A | 5/2000 | Muramatsu | | |
| 6,105,943 A * | 8/2000 | Nagasawa | ............. | F16F 13/264 267/140.14 |
| 6,129,527 A * | 10/2000 | Donahoe | ............... | F04B 35/045 417/416 |
| 6,225,886 B1 * | 5/2001 | Kleinert | .................. | H01F 7/081 251/129.15 |
| 7,348,694 B2 | 3/2008 | Tahara et al. | | |
| 7,710,225 B2 * | 5/2010 | Uni | ........................ | H01F 7/1607 335/103 |
| 2005/0201867 A1 * | 9/2005 | Hirota | ................. | F04B 27/1804 417/222.2 |
| 2005/0218734 A1 | 10/2005 | Tahara et al. | | |
| 2006/0097437 A1 * | 5/2006 | Watanabe | ............. | F16F 13/101 267/140.14 |
| 2007/0138719 A1 * | 6/2007 | Ichikawa | ............... | F16F 13/268 267/140.14 |
| 2011/0101582 A1 | 5/2011 | Kanaya | | |
| 2012/0212309 A1 * | 8/2012 | Kondo | ................ | F16K 31/0613 335/262 |
| 2014/0035397 A1 * | 2/2014 | Endo | ...................... | H02K 33/18 310/30 |
| 2017/0058989 A1 * | 3/2017 | Koyama | ............. | H02K 41/031 |
| 2017/0204935 A1 * | 7/2017 | Yasuda | ................... | F16F 13/26 |

FOREIGN PATENT DOCUMENTS

| | | |
|---|---|---|
| JP | 3845421 B2 | 11/2006 |
| JP | 4023462 B2 | 12/2007 |
| JP | 4186217 B2 | 11/2008 |
| JP | 2011-094750 A | 5/2011 |
| JP | 2013-060963 A | 4/2013 |

OTHER PUBLICATIONS

Dec. 8, 2015 International Search Report issued in International Patent Application No. PCT/JP2015/080948.

* cited by examiner

VIBRATION-DAMPING ELECTROMAGNETIC ACTUATOR, ACTIVE FLUID-FILLED VIBRATION-DAMPING DEVICE AND ACTIVE VIBRATION-DAMPING DEVICE USING THE SAME

INCORPORATED BY REFERENCE

The disclosure of Japanese Patent Application No. 2014-238840 filed on Nov. 26, 2014 including the specification, drawings and abstract is incorporated herein by reference in its entirety. This is a Continuation of International Application No. PCT/JP2015/080948 filed on Nov. 2, 2015.

BACKGROUND OF THE INVENTION

1. Field of the Invention

The present invention relates to a vibration-damping electromagnetic actuator that generates driving force of a movable member in relation to a stator through energization to a coil, an active fluid-filled vibration-damping device that applies the force generated by the vibration-damping electromagnetic actuator to a fluid chamber in order to reduce vibration in an offset fashion, and an active vibration-damping device that reduces vibration of a member subject to vibration-damping in the offset fashion by the force generated by the vibration-damping electromagnetic actuator.

2. Description of the Related Art

From the past, for an active fluid-filled vibration-damping device, an active vibration-damping device and the like, a vibration-damping electromagnetic actuator has been used as an actuator that generates oscillation force. The vibration-damping electromagnetic actuator has a stator and a movable member displaceable relative to the stator. For those stator and movable member, one has a coil member including a coil that forms a magnetic field through energization, while the other has an armature that is displaced relative to the coil member by an effect of the magnetic field formed by the coil. Note that a vibration-damping electromagnetic actuator shown in U.S. Pat. No. 7,348,694 has a structure wherein a tubular stator provided with a coil member is externally disposed about a movable member provided with an armature.

As for U.S. Pat. No. 7,348,694, a tubular guide sleeve is disposed between the stator and the movable member, and the movable member is guided in sliding contact with the guide sleeve, whereby the movable member is smoothly displaced in the axial direction while being positioned relative to the stator in the axis-perpendicular direction.

However, with the structure of U.S. Pat. No. 7,348,694, in the case where the movable member is displaced tilting relative to the stator for example, the movable member may be in contact with the guide sleeve supported by the stator with a small contact area. This can give rise to problems such as unstable motion due to sticking, abrasion of the movable member and the guide sleeve (deterioration in durability) by an increased contact pressure, and the like.

In U.S. Pat. No. 7,348,694, the lower end part of the guide sleeve is bent to form a flange shape, and this lower end part of the guide sleeve is elastically abutted to an elastic plate on the side of the stator by a coil spring, whereby the guide sleeve is supported in such a state that the guide sleeve is allowed to be tilted relative to the stator to a certain extent. However, when the stator supports the guide sleeve via these separate coil spring and elastic plate in this way, a problem like a complicated structure due to an increase in the number of parts etc. may arise.

Additionally, with a structure wherein the flange-shaped lower end part of the guide sleeve is clamped between the coil spring and the elastic plate in the axial direction, it is difficult to have the guide sleeve supported by the stator in a stable manner, while having the guide sleeve tilted following the movement of the movable member. It is because, despite desirability of hardened compression spring between the coil spring and the elastic plate in the axial direction for realizing stable support of the guide sleeve in relation to the stator, the hardened compression spring prevents the guide sleeve from tilting relative to the stator, thereby making it difficult for the guide sleeve to follow the movable member when the movable member gets tilted.

SUMMARY OF THE INVENTION

The present invention has been developed in view of the above-described matters as the background, and it is an object of the present invention to provide a vibration-damping electromagnetic actuator with a novel structure which is able to effectively guide the movable member in relation to the stator, while advantageously realizing stable motion and improvement in durability and the like with a simple structure.

Moreover, it is another object of the present invention to provide an active fluid-filled vibration-damping device and an active vibration-damping device with a novel structure including the vibration-damping electromagnetic actuator that exhibits the above-described effect.

The above and/or optional objects of this invention may be attained according to at least one of the following modes of the invention. The following modes and/or elements employed in each mode of the invention may be adopted at any possible optional combinations.

Specifically, a first mode of the present invention provides a vibration-damping electromagnetic actuator comprising: a stator; a movable member displaceable relative to the stator, and being disposed within or about the stator; a coil member with a coil generating a magnetic field through energization, which is disposed at one of the stator and the movable member; an armature displaceable relative to the coil member by an effect of the magnetic field generated by the coil, which is disposed at an other one of the stator and the movable member; a tubular guide sleeve disposed between the stator and the movable member so that the movable member is slidable along the guide sleeve; and an elastic support body fixed to the guide sleeve, the elastic support body being clamped by the stator at a portion of the elastic support body apart from the guide sleeve so that the guide sleeve is elastically supported by the stator.

With this vibration-damping electromagnetic actuator constituted according to the first mode, since the guide sleeve is disposed between the stator and the movable member, the movable member is displaced relative to the stator while being guided by the guide sleeve when the generated force acts between the stator and the movable member. Therefore, the stator and the movable member are displaced relatively and smoothly without being caught, thereby obtaining the target force efficiently and stably.

Additionally, since the guide sleeve is elastically supported by the stator via the elastic support body, tilting of the guide sleeve relative to the stator is allowed owing to elastic deformation of the elastic support body. Thus, in the case where the movable member is displaced while tilting relative to the stator, the guide sleeve is tilted following the movable member, thereby avoiding locational sliding contact of the movable member with the guide sleeve, so as to prevent problems such as abrasion and sticking.

Besides, the elastic support body is clamped by the stator at a portion thereof apart from the guide sleeve. Therefore, the elastic support body is compressed by the stator, whereby the guide sleeve is elastically supported by the stator. Meanwhile, the tilting of the guide sleeve relative to the stator is allowed owing to shear bending deformation of the elastic support body. Accordingly, owing to compression spring component of the elastic support body with comparatively large spring constant, the guide sleeve is stably supported by the stator. Meanwhile, owing to shear and bending spring component of the elastic support body with comparatively small spring constant, the guide sleeve is effectively tilted relative to the stator, thereby allowing the guide sleeve to follow the tilting of the movable member relative to the stator.

A second mode of the present invention provides the vibration-damping electromagnetic actuator according to the first mode, wherein the stator has the coil member in a tubular shape, and the coil member is disposed externally about the movable member, the coil member is housed within a housing in a shape of a bottomed cup, and the elastic support body projects from a lower end part of the guide sleeve in an axis-perpendicular direction so as to be clamped between the coil member and a bottom wall of the housing in an axial direction.

According to the second mode, since the coil member requiring energization from the outside is disposed on the side of the stator, it is possible to avoid disconnection and lighten the movable member. Also, the elastic support body that projects from the guide sleeve in the axis-perpendicular direction is clamped between the coil member and the bottom wall of the housing in the axial direction, so that the guide sleeve is stably supported owing to the compression of the elastic support body in the axial direction. Meanwhile, the guide sleeve follows the tilting of the movable member relative to the axial direction owing to the shear bending deformation of the elastic support body, so that avoidance of abrasion and sticking enables the improvement in durability and the stable motion. Moreover, the elastic support body clamped on the side of the stator is fixed to the lower end part of the guide sleeve, so that the lower end part is the center from which the tilting of the guide sleeve relative to the coil member is generated, thereby allowing the tilting of the guide sleeve to be generated efficiently with smaller force.

A third mode of the present invention provides the vibration-damping electromagnetic actuator according to the first or second mode, wherein a lower end part of the guide sleeve includes a large-diameter fixation part, and the elastic support body is fixed at the fixation part of the guide sleeve so as to project toward an outer periphery.

According to the third mode, since a part of the guide sleeve to which the elastic support body is fixed is made to have a large diameter, it becomes easier to have the portion of the elastic support body apart from the guide sleeve clamped by the stator while adjusting and setting the dimension of projection of the elastic support body from the guide sleeve. Therefore, spring characteristics of the elastic support body can be suitably adjusted, thereby realizing both the stable support and followability in relation to the tilting of the movable member for the guide sleeve.

A fourth mode of the present invention provides the vibration-damping electromagnetic actuator according to any one of the first to third modes, wherein the movable member has the armature including a permanent magnet and an inner yoke overlapped with one another, and the permanent magnet is a rare earth magnet or a ferrite magnet.

According to the fourth mode, the guide sleeve is disposed between the stator and the movable member, and the guide sleeve positions the movable member in relation to the stator in the direction orthogonal to the relative displacement direction. Thus, even if a magnetic force acts strongly between the movable member and the stator, a position gap in the axis-perpendicular direction between the movable member and the stator is rarely given rise to. Hence, even in the case of using the rare earth magnet with great holding force as the permanent magnet of the movable member, the movable member is avoided from being displaced in the direction orthogonal to the relative displacement direction by the magnetic force acting between the movable member and the stator, so that it is possible to obtain great generated force efficiently. Meanwhile, if the ferrite magnet is used, the permanent magnet can be formed easily into various shapes by sintering and obtained cheaply.

A fifth mode of the present invention provides an active fluid-filled vibration-damping device comprising: a first mounting member; a second mounting member; a main rubber elastic body elastically connecting the first mounting member and the second mounting member to each other; a fluid chamber whose wall is partially constituted by the main rubber elastic body with a non-compressible fluid sealed therein; an oscillation member constituting another part of the wall of the fluid chamber; and the vibration-damping electromagnetic actuator according to any one of the first to fourth modes being attached to the oscillation member via the movable member of the vibration-damping electromagnetic actuator so that oscillation force generated by the vibration-damping electromagnetic actuator is applied to the fluid chamber through the oscillation member.

With this active fluid-filled vibration-damping device according to the fifth mode of the present invention, as the actuator that generates the oscillation force to be applied to the fluid chamber, the vibration-damping electromagnetic actuator according to the present invention is adopted, whereby stabilizing operation and improving the durability. Especially, even in the case where the movable member gets tilted relative to the stator as a result of transmission of an input from the outside to the movable member via the oscillation member which constitutes the wall of the fluid chamber or the like, the guide sleeve is tilted following the movable member so as to avoid an adverse effect on the operation and the durability for the actuator.

A sixth mode of the present invention provides an active vibration-damping device comprising the vibration-damping electromagnetic actuator according to any one of the first to fourth modes, wherein the stator is configured to be attached to a member subject to vibration-damping, and the stator and the movable member are elastically connected to each other by a support rubber elastic body.

With this active vibration-damping device according to the sixth mode of this invention, as the actuator that generates the oscillation force to be applied to the member subject to vibration-damping, the vibration-damping electromagnetic actuator according to the present invention is used, resulting in a stabilized operation and improved durability. Moreover, even in the case where the movable member gets tilted relative to the stator due to contraction of the support rubber elastic body after molding, secular change or the like, the guide sleeve is tilted following the movable member so as to avoid the adverse effect on the operation and the durability for the actuator.

According to the present invention, a guide sleeve is disposed between a stator and a movable member disposed such that one is externally about the other, and an elastic support body fixed to the guide sleeve is clamped by the stator at an portion thereof apart from the guide sleeve, whereby the guide sleeve is elastically supported by the stator. Owing to this, tilting of the guide sleeve relative to the stator is allowed owing to elastic deformation of the elastic support body. When the movable member is tilted relative to the stator, the guide sleeve is tilted following the movable member, thereby avoiding an adverse effect on operation due to partial abrasion or sticking of the movable member etc. Moreover, owing to compression of the elastic support body exhibiting hard spring characteristics, the guide sleeve is stably supported. Meanwhile, owing to shear bending of the elastic support body exhibiting soft spring characteristics, it is possible to obtain high followability of the guide sleeve in relation to the tilting of the movable member.

BRIEF DESCRIPTION OF THE DRAWINGS

The foregoing and/or other objects, features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
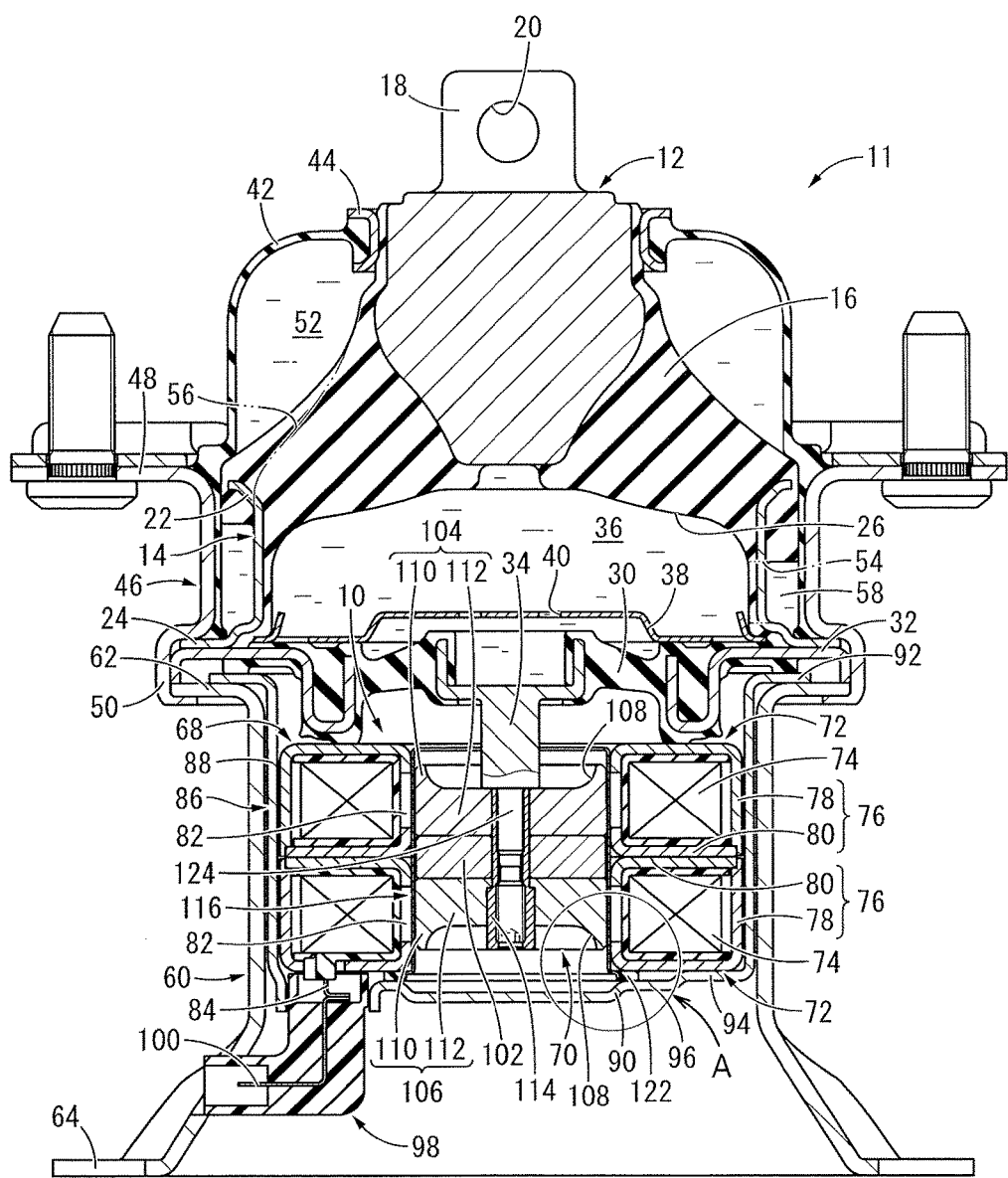
FIG. 1 is a longitudinal cross sectional view showing an active fluid-filled vibration-damping device in the form of an engine mount as a first embodiment of the present invention.

There will be described below embodiments of the present invention while referring to the drawings.

As a first embodiment of the present invention, FIG. 1 shows an engine mount 11 as an active fluid-filled vibration-damping device provided with a vibration-damping electromagnetic actuator 10 according to this invention. The engine mount 11 includes a first mounting member 12, a second mounting member 14, and a main rubber elastic body 16 connecting them to one another elastically. The descriptions hereafter presupposes that the up-down direction is the up-down direction in FIG. 1, i.e., the direction of displacement of a movable member 70 relative to a stator 68 described later, unless otherwise explained.

In more detail, the first mounting member 12 is a member with high rigidity formed of a metal, a synthetic resin, or another material, in a shape of a block extending in the up-down direction with a roughly circular cross sectional shape. The first mounting member 12 integrally includes an attachment piece 18 with a plate shape projecting above, which has a bolt hole 20 formed therethrough.

The second mounting member 14 is a member with high rigidity like the first mounting member 12, which extends in the peripheral direction with a longitudinal cross section of a concave shape opening toward the outer periphery. The whole second mounting member 14 takes the substantial form of a thin-walled, large-diameter circular tube. The upper end of the second mounting member 14 is a tapered part 22 that expands toward the upper side, while the lower end thereof is a swage plate 24 in a shape of an annular plate.

The first mounting member 12 is disposed above the second mounting member 14, and the main rubber elastic body 16 is disposed between those first mounting member 12 and second mounting member 14. The main rubber elastic body 16 has a substantial shape of a thick-walled, truncated cone. The small-diameter side end portion of the main rubber elastic body 16 is bonded by vulcanization to the first mounting member 12, while the large-diameter side end portion of the main rubber elastic body 16 is bonded by vulcanization to the second mounting member 14. The main rubber elastic body 16 of this embodiment takes the form of an integrally vulcanization molded component incorporating the first mounting member 12 and the second mounting member 14.

This main rubber elastic body 16 has a large-diameter recess 26. The large-diameter recess 26 is a recess with a circular transverse cross section that opens on the axial end surface on the large-diameter side of the main rubber elastic body 16. The upper base wall surface of the main rubber elastic body 16 has a tapered shape with its diameter reduced upward. The diameter of the large-diameter recess 26 is smaller than the inside diameter of the second mounting member 14, whereby the inner peripheral surface of the second mounting member 14 is covered with a rubber layer in a rough shape of a circular tube formed integrally with the main rubber elastic body 16. Moreover, the upper end of the second mounting member 14 including the tapered part 22 is covered with the main rubber elastic body 16 up to the outer peripheral side, so that it is bonded to the main rubber elastic body 16 as buried therein.

To this integrally vulcanization molded component of the main rubber elastic body 16, a support rubber elastic body 30 is attached. The support rubber elastic body 30 has an approximate shape of an annular plate, wherein an annular support fitting 32 is bonded by vulcanization to its outer peripheral end part. In the support fitting 32, the inner peripheral part in a groove shape is bonded to the outer peripheral end part of the support rubber elastic body 30, while the outer peripheral part approximately in an annular plate shape is overlapped with the swage plate 24 of the second mounting member 14 from below. Also, to the inner peripheral end part of the support rubber elastic body 30, an output member 34 as an oscillation member is bonded by vulcanization, thereby closing off the central hole of the support rubber elastic body 30.

The support rubber elastic body 30 incorporating the support fitting 32 and the output member 34 is attached to the integrally vulcanization molded component of the main rubber elastic body 16, whereby the large-diameter recess 26 of the main rubber elastic body 16 is covered by the support rubber elastic body 30 in a fluidtight manner. Thus, these main rubber elastic body 16, support rubber elastic body 30, and output member 34 define a primary liquid chamber 36 as a fluid chamber using the large-diameter recess 26. For the primary liquid chamber 36, a part of the wall thereof is constituted by the main rubber elastic body 16, while another part of the wall thereof is constituted by the support rubber elastic body 30 and the output member 34, and a non-compressible fluid is sealed therein. The non-compressible fluid sealed in the primary liquid chamber 36 is not limited to a particular fluid. For example, preferably adopted as the fluid is a liquid such as water, ethylene glycol, alkylene glycol, polyalkylene glycol, silicone oil, or a mixture liquid of them. Moreover, a low-viscosity fluid having viscosity of 0.1 Pa·s or lower is desirable, for advantageously obtaining vibration-damping effect based on fluid flowing action described later.

In the present embodiment, a partition fitting 38 is disposed between the support rubber elastic body 30 and the main rubber elastic body 16. The partition fitting 38 has a substantial shape of a thin circular plate, wherein the outer peripheral part is superposed to the upper surface of the support fitting 32 via the rubber elastic body, while the inner peripheral part is positioned higher than the outer peripheral part and separated upward from the support rubber elastic body 30 and the output member 34. The partition fitting 38 has also a plurality of filter orifices 40 that are small-diameter circular holes formed in the inner peripheral part penetrating therethrough in the thickness direction.

Also, to the integrally vulcanization molded component of the main rubber elastic body 16, a flexible film 42 is fixed. The flexible film 42, which is a thin rubber film being readily subject to flexural deformation, takes the substantial form of a ring extending continuously in the peripheral direction as a whole, with its longitudinal cross sectional shape being convex toward the outer periphery. The flexible film 42 is bonded by vulcanization to an inner mating fitting 44 at its upper end part (the inner peripheral end part) thereof, and to an outer swage fitting 46 at its lower end part (the outer peripheral end part).

The inner mating fitting 44 is an annular metal fitting that extends continuously across the entire periphery with a cross sectional shape of a groove opening toward the outer periphery. The upper end part of the flexible film 42 is bonded by vulcanization on the outer peripheral surface of the inner mating fitting 44. The inner mating fitting 44 is fitted externally onto the first mounting member 12, so that the upper end part of the flexible film 42 is attached to the first mounting member 12.

The outer swage fitting 46 takes the substantial form of a large-diameter circular tube as a whole, and the flexible film 42 is bonded by vulcanization on the inner peripheral surface thereof The upper end part of the outer swage fitting 46 integrally includes a flange 48 that expands to the outer peripheral side. The lower end part of the outer swage fitting 46 has a step and a swage piece 50 that projects downward from the outer peripheral end of the step. The swage piece 50 of the outer swage fitting 46 is swaged to the swage plate 24 of the second mounting member 14, whereby the lower end part of the flexible film 42 is fixed to the second mounting member 14. The upper end of the second mounting member 14 is abutted against the outer swage fitting 46 in the axis-perpendicular direction via the rubber elastic bodies. This seals a gap between the upper end of the second mounting member 14 and the outer swage fitting 46 in a fluidtight manner. In addition, the outer peripheral part of the support fitting 32 that is bonded to the support rubber elastic body 30 is fastened together with the swage plate 24 of the second mounting member 14 by swaging the swage piece 50 of the outer swage fitting 46, thereby being fixed to the second mounting member 14.

Thus, the upper end part of the flexible film 42 is attached to the first mounting member 12, while the lower end part of the flexible film 42 is attached to the second mounting member 14. Consequently, the flexible film 42 is disposed on the outer peripheral side of the main rubber elastic body 16. The flexible film 42 defines an auxiliary liquid chamber 52 together with the main rubber elastic body 16 and divides the chamber from the outside fluidtightly. The auxiliary liquid chamber 52, which can change its volume easily with its wall being partially constituted by the flexible film 42, is filled with the same non-compressible fluid as that of the primary liquid chamber 36.

The engine mount 11 further includes a tunnel-shaped passage extending peripherally continuously between the axially medial section surfaces of the second mounting member 14 and the outer swage fitting 46, which are opposite in the axis-perpendicular direction. The tunnel-shaped passage communicates with the primary liquid chamber 36 through a first communication passage 54 formed at a part on the periphery. This passage communicates with the auxiliary liquid chamber 52 through a second communication passage 56 formed at another part on the periphery, thereby providing an orifice passage 58, which communicates the primary liquid chamber 36 and the auxiliary liquid chamber 52 with one another, between the second mounting member 14 and the outer swage fitting 46. The tuning frequency of the orifice passage 58 that is the resonance frequency of the flowing fluid is set as appropriate, by adjusting the ratio (A/L) of the passage cross sectional area (A) to the passage length (L) using the wall spring rigidity for the primary liquid chamber 36 and the auxiliary liquid chamber 52. In the present embodiment, the tuning frequency is tuned to about 10 Hz corresponding to engine shake. Note that a not-shown partition wall, which is formed integrally with the main rubber elastic body 16, is fixed on the outer peripheral surface of the second mounting member 14. The length of the tunnel-shaped passage is accordingly shorter than one periphery in the peripheral direction. Besides, the communication passages 54, 56 are each formed at the respective peripheral end of the tunnel-shaped passage.

Moreover, to the outer swage fitting 46, a fastening fitting 60 is fixed. The fastening fitting 60 is, as a whole, in a substantial shape of a large-diameter circular tube, wherein the upper end part thereof is provided with a flange-shaped connection plate 62, while the lower end part thereof is provided with a flange-shaped attachment plate 64. The connection plate 62 is swaged with the swage piece 50 of the outer swage fitting 46 in order to connect the fastening fitting 60 to the outer swage fitting 46. Thus, these outer swage fitting 46 and fastening fitting 60 constitute the outer bracket. The connection plate 62 of the fastening fitting 60 is swaged together with the swage plate 24 of the second mounting member 14 and the outer peripheral part of the support fitting 32, using the swage piece 50. Consequently, the fastening fitting 60 is fixed to the second mounting member 14 and the support fitting 32.

On the inner peripheral side of the fastening fitting 60, the vibration-damping electromagnetic actuator 10 is disposed. The vibration-damping electromagnetic actuator 10 has the stator 68 and the movable member 70, which are relatively displaceable in the axial direction, being disposed such that one is positioned within the other.

The stator 68 has two coil members 72, 72 that are arranged one above the other. The coil member 72 includes a coil 74 that is constituted by a bobbin formed of a resin wound by a metal wire and an outer yoke 76 is attached to the coil 74. The coil member 72, as a whole, takes the substantial form of a large-diameter circular tube. The outer yoke 76, which is formed of a ferromagnetic material like iron, includes a first yoke 78 to be overlapped with the axial outer surface of the coil 74 and a second yoke 80 to be overlapped with the axial inner surface of the coil 74. More specifically, the first yoke 78 is attached as covering the axial outer surface and the outer peripheral surface and the axial outer edge portion of the inner peripheral surface in the coil 74. Meanwhile, the second yoke 80 is attached as covering the axial inner surface and the axial inner edge portion of the inner peripheral surface in the coil 74. Owing to this, the outer yoke 76 forms a magnetic path guiding a magnetic flux generated by energization to the coil 74 around the coil 74. Meanwhile, the first yoke 78 and the second yoke 80 are separated in the up-down direction on the inner peripheral side of the coil 74, thereby forming a magnetic gap 82.

Owing to power feed to the coils 74, 74, the magnetic flux is generated around the coils 74, 74 and guided by the magnetic path constituted by the outer yokes 76, 76. Accordingly, the outer yoke 76 has a magnetic pole formed at the formation section of the magnetic gap 82. The coil 74 of the coil member 72 on the upper side and the coil 74 of the coil member 72 on the lower side are formed with a continuous wire which is wound around the bobbins in the adverse directions relative to each other, thereby generating magnetic fluxes in the adverse directions owing to energization. Also, the upper and lower coil members 72, 72 are substantially symmetrical to one another in structure, except that the lower coil member 72 is provided with a coil terminal fitting 84 projecting downward, which is electrically connected to the coil 74.

The stator 68 is housed peripherally inside a housing 86. The housing 86, roughly in a bottomed cup shape as a whole, is provided integrally with a peripheral wall 88 in a rough shape of a circular tube, a bottom wall 90 in a rough shape of a circular disk, and a flange-shaped support piece 92 formed at its opening. In the present embodiment, the bottom wall 90 of the housing 86 has a shape of a stepped plate which is positioned gradually higher toward the outer periphery. Specifically, for this bottom wall 90, the outer peripheral edge portion is a stator support part 94 with an annular plate shape that is abutted against the stator 68, while a portion peripherally inside the stator support part 94 is a medial clamping part 96 in an annular plate shape positioned lower than the stator support part 94.

In this embodiment, the stator 68 is clamped between the inner peripheral part of the support fitting 32 and the stator support part 94 of the bottom wall 90 of the housing 86 in the axial direction, whereby the stator 68 is fixed in position to be not displaceable relative to the housing 86. The lower surface of the inner peripheral part of the support fitting 32 in a groove shape is covered with clasped rubber, which is formed integrally with the support rubber elastic body 30. This abuts the first yoke 78 of the upper coil member 72 indirectly to the support fitting 32 via the clasped rubber.

In a state where the stator 68 is attached to the housing 86, the coil terminal fitting 84 connects with a connector 98, which is mounted to the housing 86. The connector 98 is mounted at a connection hole, which is formed in the outer peripheral portion of the bottom wall 90 of the housing 86, extending downward therefrom and being bent at its medium part so as to protrude sideward. This connector 98 is provided with a connector terminal fitting 100, for which one end is in conductive contact with the coil terminal fitting 84, while the other end is exposed to the outside.

In the stator 68, the movable member 70 is inserted. The movable member 70 has an armature including a permanent magnet 102 and an upper yoke 104 and a lower yoke 106 as inner yokes that overlap the upper and lower sides of a permanent magnet 102, respectively. The permanent magnet 102, which has a substantial shape of an annular plate, is magnetized in the axial direction, thereby having the respective one of two magnetic poles formed on each of the upper and lower surfaces. Note that, as the permanent magnet 102, although an alnico based magnet etc. can be adopted, preferably adopted are a rare-earth cobalt based magnet such as a samarium-cobalt magnet, which can have great coercive force despite its smallness and lightness, and a ferrite based magnet, which has inexpensiveness and a high degree of freedom in shape.

The upper yoke 104 is formed of a ferromagnetic material like iron to which low friction surface treatment including fluororesin coating is applied. The upper yoke 104 has a substantial shape of an annular plate as a whole. For the upper yoke 104, the lower surface is a plane surface expanding in the axis-perpendicular direction, while the upper surface has a lightening part 108 in a recessed shape at its inner peripheral part. Thus, in the upper yoke 104, the outer peripheral part is a thick-walled part 110 that is large in the axial dimension, while the inner peripheral part is a thin-walled part 112 that is smaller in the axial dimension than the thick-walled part 110. The lower yoke 106 has a structure of the upper yoke 104 turned upside down. For this reason, the explanation thereabout is omitted by giving the same code numbers in the drawings.

The upper yoke 104 overlaps the upper surface of the permanent magnet 102, while the lower yoke 106 overlaps the lower surface of the permanent magnet 102. These permanent magnet 102 and upper and lower yokes 104, 106 are connected to one another by a position adjustment nut 114 being press-fitted into the central hole. Consequently, the upper and lower yokes 104, 106 are magnetized by the magnetic field of the permanent magnet 102, thereby providing the opposite magnetic poles on the outer peripheral surface of the upper yoke 104 and the outer peripheral surface of the lower yoke 106, respectively. The position adjustment nut 114 has a substantial shape of a small-diameter circular tube, with a screw thread on the inner peripheral surface. Such a position adjustment nut 114 has a larger diameter in the axially lower section than in the upper section, with the outer peripheral surface varying accordingly. The lower section with the larger diameter axially touches a step formed on the inner peripheral surface of the lower yoke 106. This axially positions the position adjustment nut 114 in relation to the permanent magnet 102 and the upper and lower yokes 104, 106.

About this movable member 70, the stator 68 in a tubular shape is externally disposed so that the movable member 70 is displaceable relative to the stator 68 in the axial direction. The movable member 70 is axially positioned in relation to the stator 68 so that the axial center of the thick-walled part 110 of the upper yoke 104 is aligned with the axial center of the magnetic gap 82 of the upper coil member 72, while the axial center of the thick-walled part 110 of the lower yoke 106 is aligned with the axial center of the magnetic gap 82 of the lower coil member 72.

Figure 2:
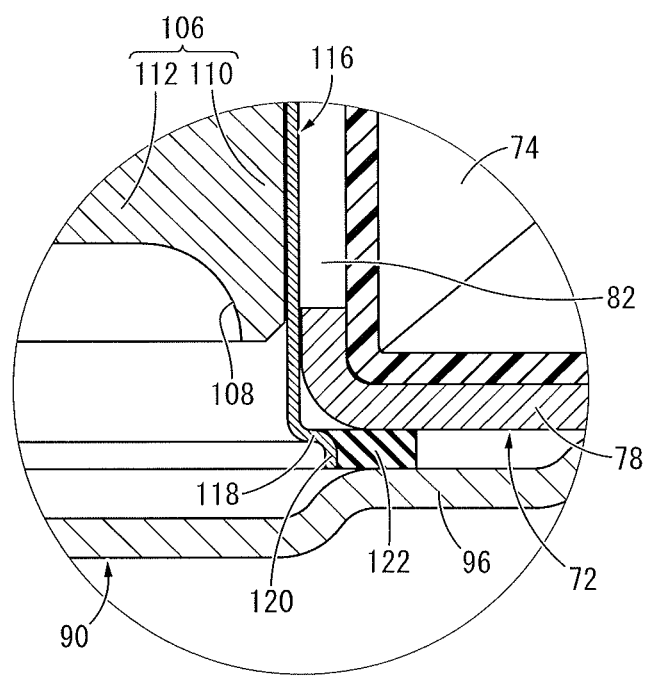
FIG. 2 is a fragmentary enlarged view of a principal part of the engine mount shown in FIG. 1, showing Part A of FIG. 1 as enlarged.

Between the stator 68 and the movable member 70, a guide sleeve 116 is disposed. The guide sleeve 116 is a member having a roughly thin-walled circular tube shape formed of a nonmagnetic stainless steel etc. The surface of the guide sleeve 116 is preferably subjected to low friction surface treatment like fluororesin coating. The upper end part of the guide sleeve 116 bends to the inner peripheral side, while the lower end part of the guide sleeve 116 includes a fixation part 120 in a tubular shape with a larger diameter, which results from having a step 118 disposed in between, as shown in FIG. 2. The guide sleeve 116 is disposed as inserted in the central hole of the stator 68. The part in the outer peripheral surface of the guide sleeve 116 on the upper side of the step 118 is slightly smaller in diameter than the inner peripheral surface of the outer yoke 76. That is, the outer peripheral surface of the guide sleeve 116 is slightly separated to the inner peripheral side from the inner peripheral surface of the outer yoke 76.

Here, the guide sleeve 116 is elastically supported by the stator 68 via an elastic support body 122. The elastic support body 122, which has an approximate shape of an annular plate or a ring, is bonded by vulcanization on the fixation part 120 provided at the lower end part of the guide sleeve 116, while projecting from the fixation part 120 toward the outer periphery. The elastic support body 122 is clamped in the axial direction between the first yoke 78 of the lower coil member 72 and the medial clamping part 96 of the bottom wall 90 of the housing 86. Consequently, the guide sleeve 116 inserted in the central hole of the stator 68 is elastically supported by the stator 68. In this embodiment, the elastic support body 122 is formed to be continuous across the entire periphery in the peripheral direction with a substantially constant cross sectional shape. However, it is also possible to provide the elastic support body 122 partially on the periphery considering the spring characteristics and durability etc. or alternatively provide it with its cross sectional shape varying in the peripheral direction, for example.

As shown in FIG. 2, both the lower surface of the stator 68 and the upper surface of the bottom wall 90 of the housing 86 axially touch the elastic support body 122. Here, the fixation part 120 of the guide sleeve 116 is positioned apart to the inner peripheral side from the section between the lower surface of the stator 68 and the upper surface of the bottom wall 90 of the housing 86 opposite to each other in contact with the elastic support body 122. Besides, the guide sleeve 116 is disposed separately slightly from the inner peripheral surface of the stator 68 in the axis-perpendicular direction, while the fixation part 120 is separated from the stator 68 and the housing 86. Consequently, the guide sleeve 116 can be subject to displacement like tilting relative to the stator 68, owing to elastic deformation of the elastic support body 122. The elastic support body 122 bonded on the guide sleeve 116 may be clamped directly by both members of the stator 68 and the housing 86 in the axial direction, the axis-perpendicular direction, a tilting direction or the like. Alternatively, the elastic support body 122 can be clamped indirectly by the both members of the stator 68 and the housing 86 via other components attached to these members.

In the guide sleeve 116, which is inserted in the inner periphery of the stator 68, the movable member 70 is slidably inserted. In the present embodiment, the outer diameter dimension of the movable member 70 is slightly smaller than the inner dimension of the guide sleeve 116 in the axis-perpendicular direction, thereby separating the movable member 70 slightly from the guide sleeve 116 to the inner peripheral side.

The coils 74, 74 are supplied with power from a not-shown power supply device connected to the connector 98, thereby each forming a magnetic field to magnetize each of the outer yokes 76, 76. This generates magnetic force between the upper and lower yokes 104, 106 of the movable member 70 and the respective outer yokes 76, 76. Therefore, the movable member 70 is displaced relative to the stator 68 in the axially up-down direction. A not-shown control device switches the direction of the current supplied for the coils 74, 74 from the power supply device at a set timing, thereby controlling the direction of displacement of the movable member 70 relative to the stator 68, i.e. oscillation frequency.

In the vibration-damping electromagnetic actuator 10 with this structure, the housing 86 is attached to the outer swage fitting 46, while the movable member 70 is attached to the output member 34.

Specifically, as for the housing 86, the support piece 92 provided for its upper end opening is inserted into a gap in the axial direction between the connection plate 62 of the fastening fitting 60 and the outer peripheral part of the support fitting 32. The connection plate 62 and the outer peripheral part of the support fitting 32 are swaged with the swage piece 50 of the outer swage fitting 46, so that the support piece 92 is fixed to the outer swage fitting 46. This swaging attaches the housing 86 provided with the support piece 92 to the second mounting member 14 via the outer swage fitting 46. The fastening fitting 60 is mounted to a not-shown vehicle body as described later, and thus the housing 86 is supported on the side of the vehicle body.

Meanwhile, the movable member 70 is fixed in a predetermined axial position relative to the output member 34, by threading a male screw 124 provided at the lower end part of the output member 34 onto the position adjustment nut 114, while threading a locking bolt into the position adjustment nut 114 from below. Suitable adjustment in the screwing amount of the position adjustment nut 114 relative to the male screw 124 enables adjustment in the axial position of the movable member 70 relative to the output member 34. Variable axial position of the output member 34 would not affect the positioning of the movable member 70 in a predetermined axial position relative to the stator 68.

For the engine mount 11 of this structure, the first mounting member 12 is mounted, via a not-shown inner bracket fixed to the attachment piece 18 with bolt, on a power unit that is not shown either, while the second mounting member 14 is mounted via the fastening fitting 60 on the not-shown vehicle body. Consequently, the engine mount 11 is interposed between the power unit and the vehicle body, so that the power unit is supported by the vehicle body in a vibration-damping manner.

Upon input of a low-frequency, large-amplitude vibration corresponding to engine shake, internal pressure fluctuation is induced in the primary liquid chamber 36. Relative pressure difference between the primary liquid chamber 36 and the auxiliary liquid chamber 52 causes a fluid flow between the both chambers 36, 52 through the orifice passage 58. This exerts vibration-damping effect on the basis of flow action like fluid resonance action.

Upon input of a medium- to high-frequency, small-amplitude vibration such as idling vibration (about some dozen Hz) or driving rumble (about 30 Hz to 200 Hz), for example, the orifice passage 58 is substantially closed by antiresonance. Meanwhile, the output member 34 constituting a part of the wall of the primary liquid chamber 36 is oscillated by the vibration-damping electromagnetic actuator 10 in the axial direction, thereby applying the oscillation force to the primary liquid chamber 36. As a result, the actively applied oscillation force cancels the input vibration, thereby yielding the target vibration-damping effect. In the present embodiment, the oscillation force is applied on the primary liquid chamber 36 through the filter orifices 40, thereby exhibiting active vibration-damping effect owing to the oscillation more effectively.

The output member 34 may be displaced under the effect of resistance of the fluid filled in the primary liquid chamber 36 etc. This can cause the movable member 70 to be displaced (oscillated) in the axial direction while tilting slightly relative to the stator 68, for example. For such a case, the engine mount 11 according to the present embodiment suffers from fewer motion impediments such as friction and sticking between the movable member 70 and the stator 68.

Specifically, the guide sleeve 116 disposed between the movable member 70 and the stator 68 is slightly separated from the stator 68 to the inner periphery, while the elastic support body 122 bonded to the guide sleeve 116 is axially clamped between the stator 68 and the housing 86, so that the guide sleeve 116 is elastically supported on the side of the stator 68. Consequently, tilting of the guide sleeve 116 relative to the stator 68 is allowed by the elastic deformation of the elastic support body 122. If the movable member 70 is tilted relative to the stator 68 by input (e.g., vibration input or resistance of the sealed fluid) or other causal force from the side of the output member 34, the guide sleeve 116 gets tilted along the tilted movable member 70 accordingly. As a result, the movable member 70, in up-down displacement, slides with a wide axial area in contact with the guide sleeve 116, thereby dispersing contact pressure. This dispersion eliminates locational abrasion, sticking and other adverse phenomena and thus yields higher durability and more stable motion.

The elastic support body 122 that is bonded on the guide sleeve 116 is supported as compressed axially between the stator 68 and the housing 86, as shown in FIG. 2. Therefore, the guide sleeve 116 can be stably supported with hard spring characteristics owing to compression spring component. On the other hand, the guide sleeve 116 is able to be tilted relative to the stator 68, by means of shear bending deformation of the elastic support body 122. Thus, this deformation of the elastic support body 122 is easily caused with comparatively soft spring characteristics, thereby smoothly allowing the tilting of the guide sleeve 116 along the movable member 70. In this way, a stable support of the guide sleeve 116 is realized by means of pure compression of the elastic support body 122, which ensures great deformation rigidity, while an excellent followability to the tilting movable member 70 is realized by means of the tilting of the guide sleeve 116 allowed by the shear bending deformation of the elastic support body 122, which ensures small deformation rigidity. Moreover, by adjusting each of the compression spring and the shear spring of the elastic support body 122 as appropriate, it is possible to set support strength and easiness of tilting for the guide sleeve 116 with a high degree of freedom.

The compression spring characteristics and the shear spring characteristics of the elastic support body 122 can be adjusted using the shape or the forming material of the elastic support body 122 itself. Instead, this adjustment can be done as well using the compression amount of the elastic support body 122 axially between the stator 68 and the housing 86, the length of the portion of the elastic support body 122 that extends out to the inner peripheral side apart from the clamped portion by the stator 68 and the housing 86 (free length), for example. In this embodiment, the large-diameter fixation part 120 is formed in the lower end part of the guide sleeve 116, so as to adjust the free length of the elastic support body 122. This realizes stable support, by which the guide sleeve 116 is not tilted in a stationary state, while exhibiting enough followability in relation to the tilting of the movable member 70.

Also, the guide sleeve 116 keeps the movable member 70 in a predetermined position in the axis-perpendicular direction. Under an effect of a greater force, which can arise between the movable member 70 and the stator 68, the guide sleeve 116 eliminates position deviation of the movable member 70 in the axis-perpendicular direction relative to the stator 68. This enables use of a strong magnet with greater coercive force, as the permanent magnet 102 of the movable member 70. For example, a rare earth magnet etc., if used, could generate a greater force. Another preferable material to be used as the permanent magnet 102 is a ferrite magnet formed by sintering with a great degree of freedom in shape. It is possible to cheaply obtain the target shape of permanent magnet 102 using the ferrite magnet.

Although the embodiments of the present invention has been described above, this invention is not limited by the specific descriptions. For example, the elastic support body can be provided projecting to the inner peripheral side from the guide sleeve 116 and compressed in the axial direction. Besides, the elastic support body 122 can be attached to the guide sleeve 116, not always through vulcanization bonding as shown in the above-described embodiment, but alternatively through other means such as adhesive bonding after molding, and elastic mating fit without bonding.

Additionally, the compression direction (clamping direction) of the elastic support body is not limited to the axial direction, and it is also possible to compress the elastic support body in the axis-perpendicular direction, for example. Specifically, it is also possible to provide the elastic support body projecting further downward from the lower end of the guide sleeve 116. This projecting portion of the elastic support body from the guide sleeve 116 is clamped in the axis-perpendicular direction by the stator 68 and the housing 86.

Also, the elastic support body 122 need not be always provided at the lower end of the guide sleeve 116. For example, the elastic support body 122 can be provided at the upper end of the guide sleeve 116 so as to be clamped between the support fitting 32 and the stator 68. Additionally, another possible embodiment has two guide sleeves 116, 116 to be superposed to the respective inner peripheral sides of the upper and lower coil members 72, 72, as disposed one above the other. More specifically, the elastic support bodies 122, 122 of this embodiment are bonded at the axial inner end parts of these guide sleeves 116, 116 to project to the outer peripheral side so that they are clamped axially between the coil members 72, 72.

In the aforementioned embodiment, the elastic support body 122 is axially compressed between the flat lower surface of the first yoke 78 and the flat upper surface of the bottom wall 90 of the housing 86. However, the elastic support body 122 need not be always clamped between opposite flat surfaces expanding parallel to each other. Specifically, it is also possible to use the structures shown in FIGS. 3 and 4, for example. As for the structure of FIG. 3, wherein the fixation part 120 of the guide sleeve 116 is bonded to an elastic support body 126 as buried therein, the portion of the elastic support body 126 provided on the outer peripheral side of the fixation part 120 is compressed axially between the curved lower surface of the inner peripheral end part of the first yoke 78 and the flat upper surface of the bottom wall 90 of the housing 86. As for the structure of FIG. 4, wherein the fixation part 120 of the guide sleeve 116 is bonded to an elastic support body 128 as buried therein, the portion of the elastic support body 128 provided on the outer peripheral side of the fixation part 120 is compressed axially between both of the flat lower surface of the first yoke 78 and the curved lower surface at the inner peripheral end part, and the flat upper surface of the bottom wall 90 of the housing 86.

Figure 3:
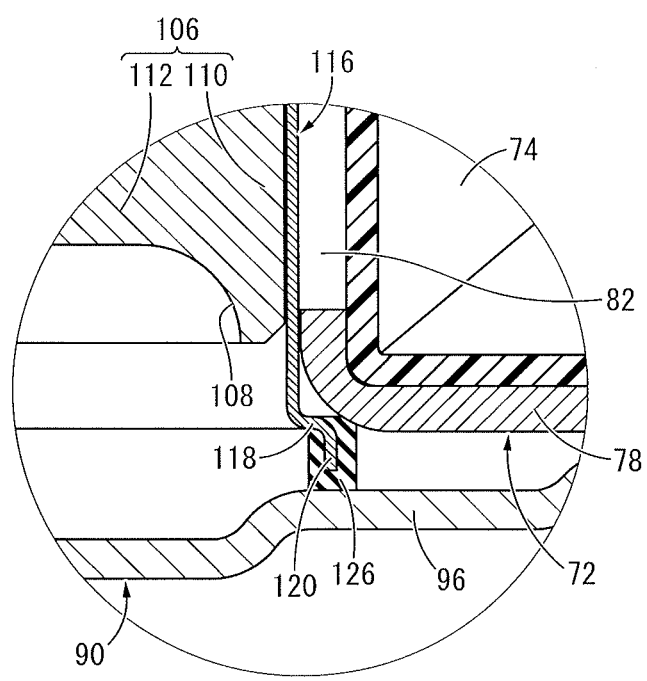
FIG. 3 is a fragmentary longitudinal cross sectional view of an engine mount as another embodiment of the present invention, showing a principal part of the engine mount as enlarged.
Figure 4:
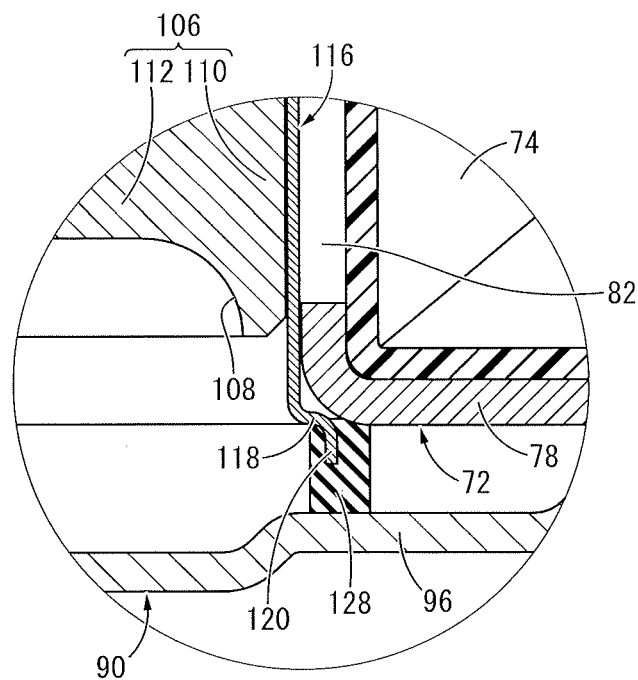
FIG. 4 is a fragmentary longitudinal cross sectional view of an engine mount as yet another embodiment of the present invention, showing a principal part of the engine mount as enlarged.

The guide sleeve 116 need not be supported by the stator 68 and the housing 86 via only the portion of the elastic support body clamped by both members of the stator 68 and the housing 86. Specifically, as shown in FIGS. 3 and 4, the guide sleeve 116 may be abutted against the housing 86 or the stator 68 at another abutment part via an elastic body, in addition to this clamped portion (the portion on the outer peripheral side of the fixation part 120 in each of the elastic support bodies 126, 128). Such another abutment part via the elastic body (for example in FIGS. 3 and 4, a portion on the inner peripheral side of the outer peripheral surface of the fixation part 120 in each of the elastic support bodies 126, 128) could improve stability of disposition condition of the guide sleeve 116 and the degree of freedom in adjustment of support spring rigidity etc.

The guide sleeve 116 is not always required to be partially larger in diameter, in the fixation part 120. For the elastic support body 122 projecting to the inner peripheral side for example, the guide sleeve can be partially smaller in diameter, in a portion of the guide sleeve which is bonded to the elastic support body 122, or alternatively be substantially constant in diameter as a whole.

The vibration-damping electromagnetic actuator 10 according to this invention can be used for an active fluid-filled vibration-damping device as shown in the aforesaid embodiment. In addition to that, this actuator is preferably used as well for an active vibration-damping device shown in Japanese Unexamined Patent Publication No. JP-A-2013-060963 and other documents, for example. Specifically, for the vibration-damping electromagnetic actuator 10 according to this invention adopted for the active vibration-damping device, the output member 34 attached to the movable member 70 and the housing 86 attached to the stator 68 are elastically connected to each other by the support rubber elastic body 30. The stator 68 and the movable member 70 are thus elastically connected to each other indirectly by the support rubber elastic body 30. The stator 68 is attached to a member subject to vibration-damping such as the vehicle body via the housing 86, whereby the oscillation force generated through energization to the coil 74 is applied to the member subject to vibration-damping via the housing 86. Consequently, the active oscillation force reduces the vibration input upon the member subject to vibration-damping in an offset fashion.

Moreover, the specific structures of the stator 68 and the movable member 70 shown in the above-mentioned embodiment are just examples, which provide no structural limitation regarding the stator and the movable member. For example, the structure disclosed in Japanese Patent No. JP-B-4186217, and other structures can be adopted. Furthermore, it is possible to use a structure wherein the coil member constitutes the movable member, while the armature constitutes the stator.

What is claimed is:

1. A vibration-damping electromagnetic actuator comprising:
    a stator;
    a movable member displaceable relative to the stator, and being disposed within or about the stator;
    a coil member with a coil generating a magnetic field through energization, which is disposed at one of the stator and the movable member;
    an armature displaceable relative to the coil member by an effect of the magnetic field generated by the coil, which is disposed at another one of the stator and the movable member;
    a tubular guide sleeve disposed between the stator and the movable member so that the movable member is slidable along the guide sleeve; and
    an elastic support body bonded to the guide sleeve, the elastic support body being clamped by the stator at a portion of the elastic support body, the portion of the elastic support body projecting in an axis perpendicular direction from the guide sleeve so that the guide sleeve is elastically supported by the stator.

2. The vibration-damping electromagnetic actuator according to claim 1, wherein the stator has the coil member in a tubular shape, and the coil member is disposed externally about the movable member, the coil member is housed within a housing in a shape of a bottomed cup, and the elastic support body projects from a lower end part of the guide sleeve in an axis-perpendicular direction so as to be clamped between the coil member and a bottom wall of the housing in an axial direction.

3. The vibration-damping electromagnetic actuator according to claim 1, wherein a lower end part of the guide sleeve includes a large-diameter fixation part, and the elastic support body is fixed at the fixation part of the guide sleeve so as to project toward an outer periphery.

4. The vibration-damping electromagnetic actuator according to claim 1, wherein the movable member has the armature including a permanent magnet and an inner yoke overlapped with one another, and the permanent magnet is a rare earth magnet or a ferrite magnet.

5. An active fluid-filled vibration-damping device comprising:
    a first mounting member;
    a second mounting member;
    a main rubber elastic body elastically connecting the first mounting member and the second mounting member to each other;
    a fluid chamber whose wall is partially constituted by the main rubber elastic body with a non-compressible fluid sealed therein;
    an oscillation member constituting another part of the wall of the fluid chamber; and
    the vibration-damping electromagnetic actuator according to claim 1 being attached to the oscillation member via the movable member of the vibration-damping electromagnetic actuator so that oscillation force generated by the vibration-damping electromagnetic actuator is applied to the fluid chamber through the oscillation member.

6. An active vibration-damping device comprising the vibration-damping electromagnetic actuator according to claim 1,
    wherein the stator is configured to be attached to a member subject to vibration-damping, and the stator and the movable member are elastically connected to each other by a support rubber elastic body.

* * * * *